March 30, 1971        C. F. SMITH        3,573,021

METHOD OF MAKING A CERAMIC-METALLIC COMPOSITE

Filed June 2, 1967

*INVENTOR.*
CARLYLE F. SMITH
BY
ATTORNEY

United States Patent Office 3,573,021
Patented Mar. 30, 1971

3,573,021
METHOD OF MAKING A CERAMIC-METALLIC COMPOSITE
Carlyle F. Smith, Alfred Station, N.Y., assignor to Sybron Corporation, Rochester, N.Y.
Filed June 2, 1967, Ser. No. 643,131
Int. Cl. C03c 29/00
U.S. Cl. 65—43
8 Claims

ABSTRACT OF THE DISCLOSURE

A high temperature melting cementitious material such as glass dust is introduced either in aqueous solution, paste or dry form, between a ceramic core and a metallic envelope. Any suspending fluid is volatilized, and the assembly then heat treated in air at temperatures of about 1400° F. to melt the glass. The molten glass assumes the shape of the space between the core and envelope so that upon cooling from the heat treating temperature, the glass solidifies into a rigid bonding layer and the metal envelope contracts exerting a uniform compressive force on the rigid bonding layer and the ceramic core. This places the core in compression and the envelope in tension which increases the overall strength of the ceramic-metallic composite.

BACKGROUND OF THE INVENTION

This invention relates generally to the process of manufacturing a ceramic-metallic composite and more specifically to a new method for combining ceramics and metals using an intermediate glass bonding layer to produce a high strength tubular, solid cylindrical or generally cylindrical composite for corrosion, abrasion and/or high temperature service.

Ceramics have several properties which make ceramic-metallic composites more desirable in corrosion, abrasion and/or high temperature-pressure service than glass-metallic composites. For example, crystalline ceramics are as a class, generally harder than glasses which have an amorphous structure. Crystalline ceramics are also generally more corrosion resistant than glass and are able to withstand higher temperatures.

There are several prior art methods of making high strength cylindrical or tubular ceramic-metallic composites which include, among others, casting, brazing and shrink fitting. In all of these methods, the metal envelope is heated before the core is inserted so that upon cooling the metal will contract and come into intimate contact about the core, placing the core in compression. This method of manufacture produces a composite which is able to withstand relatively high axial or radial tensile stresses, that is, the composite will not fail in tension until enough force is applied to overcome the compressive stresses in the core.

However, there are certain difficulties inherent in all of these prior art methods. For example, the casting method produces a high strength composite but requires the costly production of molds to hold the molten metal and special procedures are required to prevent catastrophic destruction of the ceramic core by thermal shock-stresses generated during the pouring of the molten metal about the core. In brazing, a metallic coating is applied to the ceramic and the metal envelope brazed to the coating. This method requires very precise finishing of the ceramic to match closely the inside diameter dimensions of the metal envelope. Furthermore, brazing must be conducted in a vacuum, inert or reducing atmosphere to prevent oxidation of the brazing alloy and the service temperature of the composite is limited by the melting point of the brazing alloy. In shrink fitting, the ceramic core is inserted into a heated metal envelope so that as the envelope cools it will contract about the core forming a strong mechanical bond. However, the core diameter and inside diameter of the envelope must be machined to close tolerances to insure a uniform envelope-to-core contact over the entire surface of the core. Thus, without further enumeration of other prior art methods of manufacturing a ceramic-metallic composite, it will be appreciated that no one prior art method produces a completely satisfactory generally cylindrical of tubular ceramic-metallic composite.

OBJECTS OF THE INVENTION

One object of my invention is to provide an inexpensive method of making tubular ceramic-metallic composites adapted for use in a wide variety of temperature, pressure, corrosion and abrasion service.

Another object of my invention is to provide a method of manufacturing a tubular ceramic-metallic composite in which a high temperature curing cementitious material such as glass is used to form a bonding layer between both the metallic envelope and ceramic core by heat treating at relatively high temperatures and in an air atmosphere.

A further object of my invention is to provide a method of manufacturing a ceramic-metallic composite which subjects the ceramic to a high compressive stress and the metallic envelope to a high tensile stress.

A still further object of my invention is to provide a method of manufacturing a ceramic-metallic composite which does not require that either the ceramic core or metallic envelope be machined to close tolerances.

These and other objects of this invention will become more apparent upon consideration of the following detailed description thereof when taken in conjunction with the accompanying drawings in which.

SUMMARY OF THE INVENTION

Figure 1:
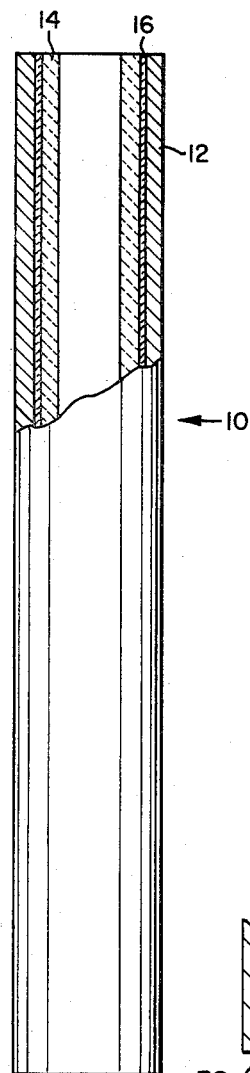
FIG. 1 is a view in cross section of a tubular composite made in accordance with the method of the present invention.

In general, the method of manufacturing a ceramic-metallic composite having the desired characteristics comprises the steps of:

(a) slidably inserting a tubular or cylindrical ceramic core into a tubular metallic envelope;
(b) flowing a fluid suspension of cementitious material such as glass dust into the space between the envelope and the core;
(c) volatilizing the suspending fluid from the suspension;
(d) heat treating the core, envelope and cementitious material until the cementitious material has melted and formed a bonding layer substantially filling the space between the ceramic core and the metallic envelope; and
(e) cooling the composite to solidify the cementitious material into a rigid bonding layer so that further cooling will cause the contracting metallic envelope to place both the rigid bonding layer and ceramic core in compression.

Another embodiment of the method comprises the further steps of:

(a) placing an annular metallic insert, adapted to fit into the space between the ceramic core and the metallic envelope, concentrically over the cementitious material which fills the space; and (b) forcing the insert into the space during heat treating and as the cementitious material melts so that the cementitious material is densified, any excess of the cementitious material being extruded from the space by the insertion therein of the annular metallic insert.

The method of the present invention resides broadly in the bonding of a metal envelope to a ceramic core having a length less than, but no more than 5% greater than the length of the metal envelope wherein the bonding material is an amorphous material such as glass. The ceramic core further having a lower thermal expansion than the metal and the bonding being affected at relatively high temperatures and in an air atmosphere such that upon cooling high compressive stresses are generated uniformly in the ceramic core by virtue of the core and metal envelope having different coefficients of thermal expansion. This process takes advantage of the ability of ceramics to withstand strong compressive forces and minimizes the weakness of the ceramic in tension. Since the ceramic core is placed under a high compressive stress by the cooling metal envelope, the composite is able to withstand relatively high axial or radial tensile stresses. That is, a relatively high tensile stress must be applied to overcome the compressive stresses before the ceramic core is placed in tension. On the other hand, additional compression can be applied to the composite which may even go so far as to cause permanent deformation of the metal envelope without damaging the ceramic core. For example, the tubular composites made with the method of my invention have been subjected to the stresses caused by die cutting a thread in the metal envelope without damaging the ceramic core.

The present method has an advantage over a simple shrink-fit or brazing process because the space between core and envelope is filled, prior to heating, with an amorphous bonding material having a high melting temperature, such as a glass frit, thereby eliminating the necessity of machining both the core and envelope to close tolerances. That is, the glass frit becomes molten at high temperatures and is able to assume the shape of the space between the ceramic core and the expanded metallic envelope. Upon cooling the metallic envelope begins to contract about the molten glass which is also cooling. For a time, the cooling molten glass, being viscous, is able to flow and accommodate the contracting envelope so that no compressive force is transmitted to the core. Upon further cooling, the molten glass becomes rigid and forms a continuous interwall medium or bonding layer between the ceramic core and the metallic envelope. As the cooling metal envelope now contracts, the rigid bonding layer is no longer able to flow and accommodate the contracting envelope so that the contracting envelope generates a uniform compressive force which is transmitted to the core through this continuous interwall medium or bonding layer. Furthermore, the process can be carried out in an air atmosphere because a brazing alloy, which may oxidize at high temperatures, is not used.

Thus, according to the method of the present invention, it is now possible to produce a ceramic-metallic composite which is capable of much more economical manufacture and which can be used in a broad range of temperature, pressure, corrosion and abrasive services and which can be subject to further machining or deformations to effect joining by standard threading or compression fitting techniques. A fuller understanding of the invention may be obtained by referring to the following detailed description in conjunction with the accompanying drawings depicting the same.

DESCRIPTION OF PREFERRED EMBODIMENTS

Referring to the drawings, FIG. 1 shows a high strength tubular composite generally indicated at 10 suited to corrosion, abrasion and/or high temperature service which can be made by the method of my invention. The composite includes a metallic envelope 12 and a ceramic core 14. An intermediate rigid bonding layer 16 of high temperature melting amorphous cementitious material such as glass fills the space between envelope 12.

Figure 2:
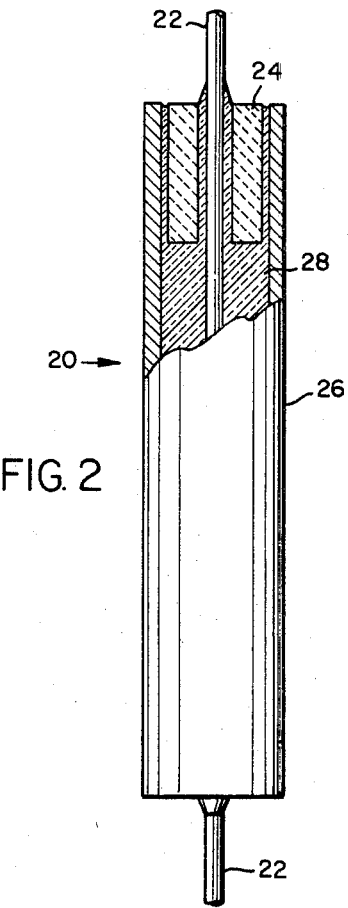
FIG. 2 is a view partly broken away showing a solid ceramic-metallic composite made in accordance with the method of my invention.
Figure 3:
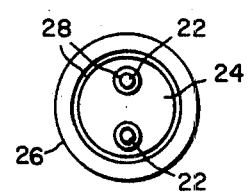
FIG. 3 is an end view of FIG. 2.

FIGS. 2 and 3 show a solid composite generally indicated at 20 which can be made by the method of my invention for use as an electrical lead-in assembly. The lead-in assembly can be used together with compression fittings (not shown) to provide a gas tight electrically insulated assembly for transferring electricity from one gaseous environment to another while maintaining the separation of the gas species of the two environments. Assembly 20 includes a pair of electrical conductors 22 inserted through ceramic insulators 24, which are in turn inserted into a metallic envelope 26. In the embodiment of FIGS. 2 and 3, a bonding layer 28 of solidified glass is bonded to the conductor, ceramic insulator and metallic envelope. The bonding layer further provides a seal which, after cooling to room temperature, is impermeable to the direct passage of air.

Figure 4:
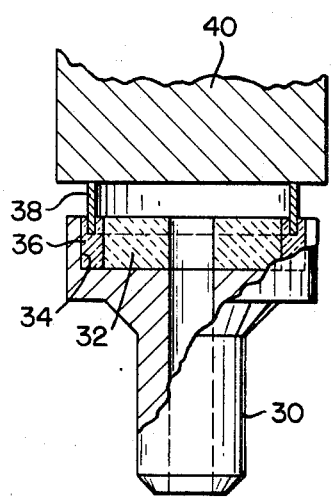
FIG. 4 is a view in cross section of a ceramic-metallic composite illustrating an embodiment of the method of the present invention.

FIG. 4 shows a flanged nozzle with a ceramic insert. The nozzle includes a metallic envelope 30 and a ceramic element 32. The envelope 30 and core element 32 together define an annular space 34 therebetween which has been filled with glass dust as indicated at 36. It is understood that when filling space 34 with a material such as glass dust certain voids are inevitably formed. Therefore, an annular metallic insert 38 which will fit into annular space 34 is placed concentrically upon the glass dust filling the space and a force as represented by weight 40 is applied to the insert. Heat treating melts the glass so that weight 40 can force insert 38 into the annular space as shown in FIG. 4. Forcing insert 38 into the molten glass removes these voids, the space previously occupied by these voids being filled by insert 38. Any excess of molten glass will simply be extruded from the annular space 34.

Example I

A ceramic-metallic composite was made by inserting a 4.125 inch long section of high alumina tubing ⅗ in. I.D. by 0.700 to 0.712 in. O.D. into a 4.000 inch long section of 0.724 in. I.D. seamless mild steel boiler tubing. An aqueous suspension of glass particles was then introduced between the ceramic tube and the steel tube. The suspending fluid was volatilized and the whole assembly then subjected to heat treatment at 1400° F. for five minutes. After cooling, it was found that the glass particles had fused together leaving on one side of the tube a ¼ in. air gap between the core and the metal tube. The slip of glass particles was again introduced into this gap, the slip dried and the assembly heated to 1400° F. for five minutes. The process was repeated a third time and upon cooling, it was noted that the glass had fused and was bonded to both the ceramic tube and the steel tube and was impermeable to air under pressure. The integrity of the ceramic was maintained and no cracking of the ceramic core was evidenced even afoter the metal tubing was threaded with ¾ inch pipe thread using a pipe die set.

Example II

Sections of ceramic and steel tubing with the same specifications as in Example I were coated on the bonding surfaces with an aqueous suspension of glass particles. After the suspending fluid was volatilized, the tubes were heat treated independently at 1800° F. for five minutes. After cooling, it was noted that the glass had fused to both tubes forming a glaze on both the interior surface of the tube and the exterior surface of the core but it was still possible to insert the glazed ceramic tube into the glazed steel tube. An aqueous suspension of glass particles was then introduced between the ceramic and metal tubes, dried and fired at 1800° F. After cooling, it was noted that the ceramic tube was substantially concentric with the steel tube, and the glassy cementitious interlayer was impermeable to air under pressure. The ceramic was intact, uncracked and firmly bonded to the steel, even after a ¾ in. pipe thread was cut into the steel tubing.

Example III

A gas tight electrical lead-in assembly was prepared by inserting an electrical conductor into electrical insulators of aluminum oxide. The sub-assembly, comprising the conductors and insulators, was in turn inserted into a stainless steel tube and an aqueous suspension of glass particles was then forced by hydrostatic pressure into all remaining crevices. After the suspending fluid was volatilized, the whole assembly was subjected to heat treatment at 1680° F. At this temperature, the glass particles became fluid and bonded to each other, the metal envelope, the aluminum oxide insulator and to the electrical conductor. A continuous glass seal was made, which after cooling to room temperature, proved to be impermeable to the passage of air. The tubing and its contents were then assembled through a 316 stainless steel tubing adapter using standard compression fittings. The fittings were tightened until both the compression fitting and metal envelope were deformed. In this manner, a gas tight seal was fomed without damaging the ceramic.

It is not known why the article made as set out in Example III remains impermeable to the passage of air. It would appear that since the electrical conductor 22 (FIGS. 2 and 3) has a greater coefficient of expansion than either the ceramic insulator tube 24 or the glass bonding layer 28, the conductor would shrink radially faster upon cooling, than the insulator tube and separate from the insulator. However, this is not the case and as set out in the example, the glass seal is impermeable to the passage of air and the seal remained intact even after the metallic envelope was deformed. One possible explanation is that the cooling metallic envelope subjects the ceramic insulator to such a large compressive force that the insulator is reduced in diameter to compensate for the coefficient differential. For example, tests using a ceramic core having a nominal diameter of 1.500 inches showed that the diameter of the core was reduced by .005 inch when subjected to the compressive force exerted by the metallic envelope.

Example IV

A ceramic inserted flanged nozzle of FIG. 4 was prepared by inserting an aluminum oxide ring 3.000 in. O.D. into a 3.150 in. O.D. seat premachined in a mild steel nozzle. Dry glass dust was packed into the space formed between the 3.000 in. O.D. aluminum oxide ring and the side wall of the 3.150 in. O.D. seat. A mild steel ring 3.125 in. O.D. by 3.005 in. I.D. was then placed concentrically upon the glass dust and the ring weighted. When heat treated at approximately 1600° F. the glass dust becomes viscous permitting the weight to force the mild steel ring into the space between aluminum oxide ring and the side wall of the seat. Some molten glass was noticed to extrude from the space and upon cooling the glass and mild steel ring together formed a bonding layer between the aluminum oxide ring and nozzle that was rigid, uncracked and impermeable to liquid at a pressure of 500 p.s.i.

Accordingly, it is seen that my invention fully accomplishes its intended objects. While I have disclosed and described in detail the preferred embodiments of my invention, that has been done by way of illustration only without thought of limitation, it being understood that various modifications will be apparent to those skilled in the art. For example, the method of the present invention should not be limited to making composites which have a large length-to-diameter ratio, since it is also possible to use the present invention for the manufacture of articles approaching the configuration of a disc. Furthermore, the present invention can be used to manufacture not only cylindrical articles but also other articles, such as a nozzle which has a diverging throat.

While one advantage of the method of the present invention is that heat treating can be carried on in an air atmosphere, it should be readily apparent that the method can also be carried on in an inert atmosphere in cases where the metallic envelope is made from a reactive metal subject to destructive oxidation when heated above 1000° F. in an air atmosphere.

Having thus fully disclosed and completely described the method of my invention, what I claim as new is:

1. A method of making a generally cylindrical ceramic metallic composite having a tubular envelope and a ceramic core wherein the ceramic core is under a compressive stress, comprising the steps of:
    (a) slidably inserting a generally cylindrical ceramic core into a generally tubular metallic envelope, the outer surface of said core and the inner surface of said envelope defining a space therebetween;
    (b) introducing particles of a high temperature melting cementitious material into the space between the core and envelope;
    (c) heat treating said core, envelope and cementitious material at a temperature below the melting point of said ceramic core to radially expand said envelope and melt said cementitious material wherein said molten material substantially fills and assumes the shape of the space between said ceramic core and expanded envelope;
    (d) cooling said core, envelope and molten material to radially contract said envelope about said molten material and core, said molten material flowing and accommodating contraction of said envelope to maintain said core substantially free of compressive stresses; and
    (e) further cooling said core, envelope and molten material until said material becomes rigid and forms a rigid bonding layer between said envelope and core wherein further cooling and radial contraction of said envelope exerts a uniform compressive force directed radially inward on said rigid bonding layer and core to place said core under a compressive loading.

2. The method as set forth in claim 1 in which an aqueous suspension of said high temperature melting cementitious material is introduced into said space between said core and said envelope prior to heat treating.

3. The method as set forth in claim 2 in which said suspending fluid is volatilized prior to heat treating.

4. The method as set forth in claim 1 in which said high temperature melting material is glass dust.

5. The method as set forth in claim 1 in which said heat treating is done at temperatures above 1000° F. and below the melting point of said ceramic core and envelope to melt said cementitious material.

6. The method as set forth in claim 1 further comprising the step of forcing a metallic insert into said space during said heat treatment and as said cementitious material melts, whereby said cementitious material is densified and excess melted cementitious material extruded from said space.

7. The method as set forth in claim 1 further comprising the steps of:
    (a) coating the exterior surface of said ceramic core with particles of said cementitious material; and
    (b) heating said ceramic core to melt and fuse said particles one to another and to the exterior surface of said core prior to slidably inserting said core into said envelope.

8. The method as set forth in claim 1 further comprising the steps of:
    (a) coating the internal surface of said tubular metallic envelope with particles of said cementitious material; and (b) heating said envelope to melt and fuse said particles one to another and to said envelope prior to slidably inserting said core therein.

References Cited

UNITED STATES PATENTS

| | | | |
|---|---|---|---|
| 1,531,265 | 3/1925 | Devers | 65—59X |
| 2,138,660 | 11/1938 | Mann | 65—59X |
| 2,367,445 | 1/1945 | Stoltenberg | 65—59X |
| 2,480,903 | 9/1949 | Charbonneau | 65—59X |
| 2,949,376 | 8/1960 | Comer | 65—59X |
| Re. 25,791 | 6/1965 | Claypoule | 65—59X |
| 2,962,684 | 11/1960 | Lien, Jr. | 65—59X |
| 3,189,677 | 6/1965 | Anthony et al. | 65—59X |
| 3,225,132 | 12/1965 | Baas et al. | 65—59X |
| 2,707,850 | 5/1955 | Dalton et al. | 65—43X |
| 3,220,815 | 11/1965 | McMillan et al. | 65—43X |

FRANK W. MIGA, Primary Examiner

U.S. Cl. X.R.

65—59, 155, 45, 54

PO-1050
(5/69)

UNITED STATES PATENT OFFICE
CERTIFICATE OF CORRECTION

Patent No. 3,573,021          Dated March 30, 1971

Inventor(s) C. F. Smith

It is certified that error appears in the above-identified patent and that said Letters Patent are hereby corrected as shown below:

Column 4, line 5 after "envelope 12" insert --and core 14.--
Column 4, line 42 "3/5" should be --3/8--

Signed and sealed this 25th day of January 1972.

(SEAL)
Attest:

EDWARD M. FLETCHER, JR.
Attesting Officer

ROBERT GOTTSCHALK
Commissioner of Patent